United States Patent
Fujiki et al.

(10) Patent No.: US 11,509,854 B2
(45) Date of Patent: Nov. 22, 2022

(54) VIDEO SIGNAL RECEIVER, VIDEO SIGNAL RECEPTION MODULE, AND VIDEO SIGNAL TRANSMISSION AND RECEPTION SYSTEM

(71) Applicant: THINE ELECTRONICS, INC., Tokyo (JP)

(72) Inventors: Rei Fujiki, Tokyo (JP); Daisuke Iwama, Tokyo (JP)

(73) Assignee: THINE ELECTRONICS. INC., Tokyo (JP)

( * ) Notice: Subject to any disclaimer, the term of this patent is extended or adjusted under 35 U.S.C. 154(b) by 0 days.

(21) Appl. No.: 16/245,460

(22) Filed: Jan. 11, 2019

(65) Prior Publication Data

US 2019/0222795 A1   Jul. 18, 2019

(30) Foreign Application Priority Data

Jan. 12, 2018 (JP) .............................. JP2018-003295

(51) Int. Cl.
*H04N 5/77* (2006.01)
*H04N 7/18* (2006.01)
(Continued)

(52) U.S. Cl.
CPC ................. *H04N 5/77* (2013.01); *H04N 5/38* (2013.01); *H04N 5/44* (2013.01); *H04N 7/18* (2013.01); *H04N 7/181* (2013.01)

(58) Field of Classification Search
None
See application file for complete search history.

(56) References Cited

U.S. PATENT DOCUMENTS

| 6,523,178 B1 * | 2/2003 | Todogawa .......... H04L 49/3081 348/737 |
| 2007/0030342 A1 * | 2/2007 | Wilburn ............... H04N 5/3532 348/47 |

(Continued)

FOREIGN PATENT DOCUMENTS

| CN | 1228900 A | 9/1999 |
| CN | 101320319 A | 12/2008 |

(Continued)

OTHER PUBLICATIONS

""Deep learning seminar" introducing the front lines of NVIDIA, automatic driving and automatic recognition Announcing improvements of pedestrian detection accuracy by heterogeneous learning", Internet URL https://car.watch.impress.co.jp/docs/topics/717652.html; Aug. 26, 2015, ( 57 pages total).

(Continued)

*Primary Examiner* — Samira Monshi
(74) *Attorney, Agent, or Firm* — Sughrue Mion, PLLC (57) ABSTRACT

A video signal transmission and reception system includes a video signal receiver in a video signal reception module, a video signal transmitter in a camera module, and a specific video signal transmitter in a specific camera module. In the specific camera module, a frame signal generated by a frame signal generator is sent to the video signal receiver from the specific video signal transmitter. The frame signal is sent to the video signal transmitters in a plurality of the camera modules from the video signal receiver.

10 Claims, 8 Drawing Sheets

(51) Int. Cl.
*H04N 5/44* (2011.01)
*H04N 5/38* (2006.01)

(56) References Cited

U.S. PATENT DOCUMENTS

| | | | | |
|---|---|---|---|---|
| 2016/0021292 A1* | 1/2016 | Zhang | ............... | H04N 5/06 |
| | | | | 348/211.2 |
| 2019/0222790 A1 | 7/2019 | Fujiki et al. | | |
| 2019/0222796 A1 | 7/2019 | Fujiki et al. | | |
| 2020/0068097 A1* | 2/2020 | He | ............... | H04N 5/04 |
| 2020/0213480 A1* | 7/2020 | Kim | ............... | H04N 5/247 |

FOREIGN PATENT DOCUMENTS

| | | |
|---|---|---|
| CN | 103475691 A | 12/2013 |
| CN | 103702073 A | 4/2014 |
| JP | 2000-244896 A | 9/2000 |
| WO | 2017001069 A1 | 1/2017 |

OTHER PUBLICATIONS

"Image Sensing Products", Sony, URL:https://www.sony.co.jp/Products/ISP/interview/vol0_1_.html, Dec. 11, 2017, (15 pages total).

"Board Setting Method for Camera Connection (External Trigger)—External Trigger Synchronized imaging with AIPTool!" Aval Data Corporation, <URL: http://www.avaldata.co.jp/solution_imaging/cameralink_tips/aiptool_ex_trg.html>, Dec. 11, 2017, (21 pages total).

"New MotorVu™ 360 reference design enables four-channel HD surround view and recording" Ambarella, <URL: https://www.ambarella.com/news/48/122/Ambarella-Unveils-HD-360-View-Automotive-Camera-Solution>, Dec. 11, 2017, ( 4 pages total).

"B5 Video Serializer/De-Serializer Companion Chips" Ambarella, <URL:https://www.ambarella.com/uploads/ docs/MotorVu-360-product-brief.p,> Dec. 25, 2017, ( 2 pages total).

U.S. Appl. No. 16/245,528, filed Jan. 11, 2019 (Fujiki et al).
U.S. Appl. No. 16/245,493, filed Jan. 11, 2019 (Fujiki et al).

* cited by examiner

VIDEO SIGNAL RECEIVER, VIDEO SIGNAL RECEPTION MODULE, AND VIDEO SIGNAL TRANSMISSION AND RECEPTION SYSTEM

TECHNICAL FIELD

The present invention relates to a video signal receiver, a video signal reception module, and a video signal transmission and reception system.

BACKGROUND

A technology for analyzing a plurality of videos acquired at the same time using a plurality of cameras has been developed. For example, in an advanced driver assistance system (ADAS) that detects and avoids a possibility of occurrence of an accident or the like in advance, in order to implement automated driving, surrounding environment information such as a vehicle, a pedestrian, and an inter-vehicle distance is extracted from a camera video information by processing video information acquired by multiple cameras mounted in an automobile in real time and applying deep learning technology. A graphic processor unit (GPU) that performs a pattern matching process using deep learning technology has been developed. By using the GPU, for example, a platform that can process 12 channels of camera video signals can be configured (Non-Patent Document 1).

In such a system, it is important that multiple cameras acquire videos substantially at the same time. For example, in a case where it is assumed that a plurality of cameras mounted in an automobile legally traveling at a speed of 250 km/h on Autobahn in Germany acquire information related to a surrounding environment at a frame rate of 30 Frames per second (fps) without synchronizing with each other, a maximum 16.7 ms of difference in capturing time is present among the plurality of cameras, and a spatial position captured by each camera varies by maximum 1.2 m approximately. In order to extract the surrounding environment information after dealing with such a difference in video acquisition time, an additional process that is different from an original surrounding environment information extraction process is needed.

Accordingly, it is important that each camera acquires a video substantially at the same time. For example, in a case where the automobile is traveling at a speed of 250 km/h, and each camera acquires a video at a difference in time of less than or equal to 150 µs, a difference in spatial position captured by each camera is 10 mm, and the additional process is not needed.

In general, not only a lens system and an image sensor (for example, a CMOS image sensor) but also an oscillator that drives the image sensor by supplying a clock to the image sensor are arranged inside a camera module. However, oscillation characteristics of the oscillator have individual differences. In a case where a capturing timing is generated in each of a plurality of camera modules using a clock output from an incorporated oscillator as a reference, capturing operations of the plurality of camera modules cannot be in synchronization.

In a case where a common clock is supplied to the plurality of camera modules from an external oscillator, the capturing timings of the plurality of camera modules can be set to be substantially the same (Non-Patent Document 2). However, in the case of mounting in the automobile, a clock supply line longer than 10 m may be needed between the external oscillator and the camera module. The weight of the clock supply line causes the fuel efficiency of the automobile to deteriorate. In addition, the clock supply line having a long distance acts as an antenna and causes radiation of an unnecessary electromagnetic wave. Accordingly, it is not preferable to supply a common clock to the plurality of camera modules from the external oscillator.

The capturing timings of the plurality of camera modules can also be set to be substantially the same by supplying a common capturing start timing instruction signal to the plurality of camera modules from the outside instead of the common clock (Non-Patent Document 3). Generally, the camera module has a function of starting capturing by receiving the capturing start timing instruction signal. After capturing is started, the camera module operates based on the clock output from the incorporated oscillator. Thus, a difference of one frame is present in capturing end time. However, by periodically repeating the supply of the common capturing start timing instruction signal to the plurality of camera modules again before the difference leads to a significant problem, the difference in operation timing among the plurality of camera modules can be set to be less than or equal to a difference of a certain constant time.

A frame signal that represents the capturing start timing in each frame is used as the capturing start timing instruction signal periodically supplied to the plurality of camera modules in common. In the case of a frame rate of 30 fps, the frame signal is supplied at an interval of approximately 33 ms. A deviation of an oscillation frequency of the oscillator incorporated in the camera module is generally 100 ppm. In this case, while the difference in operation timing that is present among the plurality of camera modules in a period (33 ms) of one frame from the timing of a certain frame signal until the timing of the subsequent frame signal is maximum 3.3 µs, such a difference is less than the above allowance value (150 µs).

A signal line for supplying the common frame signal to the plurality of camera modules may be longer than 10 m in the same manner as the case of the above clock supply line. While a central operation processor can generate the frame signal, the central operation processor and the image sensor generally do not have a capability of transmitting and receiving the video signal and the frame signal through a signal line having a long distance.

Therefore, a video signal transmitter and a video signal receiver having a capability of transmitting and receiving a signal through a signal line having a long distance are used as dedicated interfaces (Non-Patent Document 4 and Non-Patent Document 5). Each of the video signal transmitter and the video signal receiver is configured as a semiconductor integrated circuit. The video signal transmitter constitutes the camera module along with the image sensor and the like. The video signal receiver constitutes a video signal reception module along with the central operation processor.

The video signal transmitter sends the video signal acquired by the image sensor to the video signal receiver. The video signal receiver receives the video signal sent from the video signal transmitter and provides the video signal to the central operation processor. In addition, the video signal receiver sends a control signal such as the frame signal generated by the central operation processor to the video signal transmitter. The video signal transmitter receives the control signal sent from the video signal receiver and provides the frame signal to the image sensor. In each of the video signal transmitter and the video signal receiver, a general-purpose terminal can be used as a terminal for transmitting and receiving the control signal.

(Non-Patent Document 1): (NVIDIA, introducing the forefront of automated driving and automatic identification in "deep learning seminar", announcing improvement and the like in pedestrian detection accuracy using heterogeneous learning, [online], Aug. 26, 2015, Impress Corporation, [searched on Dec. 11, 2017], Internet <URL: https://car.watch.impress.co.jp/docs/topics/717652.html>)

(Non-Patent Document 2): "Image Sensing Products", [online], Sony, [searched on Dec. 11, 2017], Internet <URL: https://www.sony.co.jp/Products/ISP/interview/vol01.html>)

(Non-Patent Document 3): "Board Setting Method for Camera Connection (External Trigger)—External Trigger Synchronized Capturing Using AIPTool!", [online], AVAL DATA. CORPORATION, [searched on Dec. 11, 2017], Internet <URL: http://www.avaldata.co.jp/solution_imaging/cameralink_tips/aiptool_ex_trg.html>)

(Non-Patent Document 4): "New MotorVu™ 360 reference design enables four-channel HD surround view and recording", [online], Ambarella, [searched on. Dec. 11, 2017], Internet <URL: https://www.ambarella.com/news148/122/Ambarella-Unveils-HD-360-View-Automotive-Camera-Solution>

(Non-Patent Document 5): "135 Video Serializer/De-Serializer Companion. Chips", [online], Ambarella, [searched on Dec. 25, 2017], Internet <URL: https://www.ambarella.com/uploads/docs/MotorVu-360-product-brief.pdf>)

SUMMARY

However, a configuration in which the frame signal generated by the central operation processor is sent to the image sensor through the video signal receiver and the video signal transmitter has the following problem. That is, in the central operation processor that has to perform various processes, it is not easy to perform a process of generating the frame signal at a temporally high accuracy timing and sending the frame signal from the general-purpose terminal. In addition, even in a case where the process of generating and sending the frame signal can be performed in the central operation processor, the frame signal sending process may adversely affect other important processes due to limitations on a processing capability.

In order to resolve such a problem, it is considered that the frame signal is generated in the video signal receiver instead of generating the frame signal in the central operation processor. In a case where the frame signal is generated in the video signal receiver, the throughput of the central operation processor is reduced.

A configuration in which the frame signal generated in the video signal receiver is sent to the image sensor through the video signal transmitter has the following problem. That is, it may not be possible or may be difficult that the frame signal that can be generated by the video signal receiver satisfies specifications of the frame signal required in the image sensor. In addition, a supplier of the video signal receiver is generally different from a supplier of the camera module. Thus, designing and manufacturing the video signal receiver that can generate the frame signal satisfying specifications required in the camera module needs clear delivery or confirmation of specifications between the suppliers and is not easy.

The invention is conceived based on the result of the inventor's review in order to resolve the above problem. An object of the invention is to provide a video signal receiver that can easily supply a frame signal satisfying specifications required in an image sensor, a video signal reception module that includes such a video signal receiver, and a video signal transmission and reception system that includes such a video signal receiver or a video signal reception module and a video signal transmitter.

A video signal receiver of the invention is connected through a signal line to a plurality of video signal transmitters each sending a video signal acquired by capturing by a camera and receives the video signal sent from each of the plurality of video signal transmitters. The video signal receiver includes a frame signal receiver that receives a frame signal sent from any specific video signal transmitter among the plurality of video signal transmitters, and a frame signal transmitter that sends the frame signal received by the frame signal receiver to a video signal transmitter of a first group other than the specific video signal transmitter among the plurality of video signal transmitters. It is preferable that the video signal receiver of the invention further includes an output unit that outputs the frame signal received by the frame signal receiver.

A video signal reception module of the invention includes (1) the first video signal receiver stated above, and (2) a second video signal receiver including an input unit that inputs the frame signal output from the output unit of the first video signal receiver, and a frame signal transmitter that sends the frame signal input by the input unit to a video signal transmitter of a second group other than the specific video signal transmitter among the plurality of video signal transmitters.

Alternatively, a video signal reception module of the invention includes (1) a first video signal receiver that is connected through a signal line to a specific video signal transmitter sending a video signal acquired by capturing by a camera, receives the video signal sent from the specific video signal transmitter, receives a frame signal sent from the specific video signal transmitter, and outputs the received frame signal, and (2) a second video signal receiver that is connected through a signal line to a video signal transmitter sending a video signal acquired by capturing by a camera, receives the video signal sent from the video signal transmitter, receives input of the frame signal output from the first video signal receiver, and sends the input frame signal to the video signal transmitter.

A video signal transmitter of the invention includes a frame signal transmitter that sends a frame signal used in capturing by a camera.

A video signal transmission and reception system of one aspect of the invention includes (1) a plurality of video signal transmitters each sending a video signal acquired by capturing by a camera, and (2) the video signal receiver of the invention that receives the video signal sent from each of the plurality of video signal transmitters, receives a frame signal sent from any specific video signal transmitter among the plurality of video signal transmitters, and sends the frame signal to a video signal transmitter other than the specific video signal transmitter among the plurality of video signal transmitters. The specific video signal transmitter is the video signal transmitter of the invention. The video signal transmitter other than the specific video signal transmitter among the plurality of video signal transmitters receives the frame signal sent from the video signal receiver and outputs the frame signal to a corresponding camera.

A video signal transmission and reception system of another aspect of the invention includes (1) a plurality of video signal transmitters each sending a video signal acquired by capturing by a camera, and (2) the video signal reception module of the invention that receives the video signal sent from each of the plurality of video signal transmitters, receives a frame signal sent from any specific video signal transmitter among the plurality of video signal transmitters, and sends the frame signal to a video signal transmitter other than the specific video signal transmitter among the plurality of video signal transmitters. The specific video signal transmitter is the video signal transmitter of the invention. The video signal transmitter other than the specific video signal transmitter among the plurality of video signal transmitters receives the frame signal sent from the video signal reception module and outputs the frame signal to a corresponding camera.

According to the invention, the frame signal satisfying specifications required in an image sensor can be easily supplied.

DETAILED DESCRIPTION

Hereinafter, embodiments of the invention will be described in detail with reference to the appended drawings. The same elements in the description of the drawings will be designated by the same reference signs, and duplicate descriptions of such elements will not be repeated. It is intended that the invention is not limited to those illustrations and is shown by the claims and includes all changes made within the equivalent meaning and scope of the claims.

First Embodiment

Figure 1:
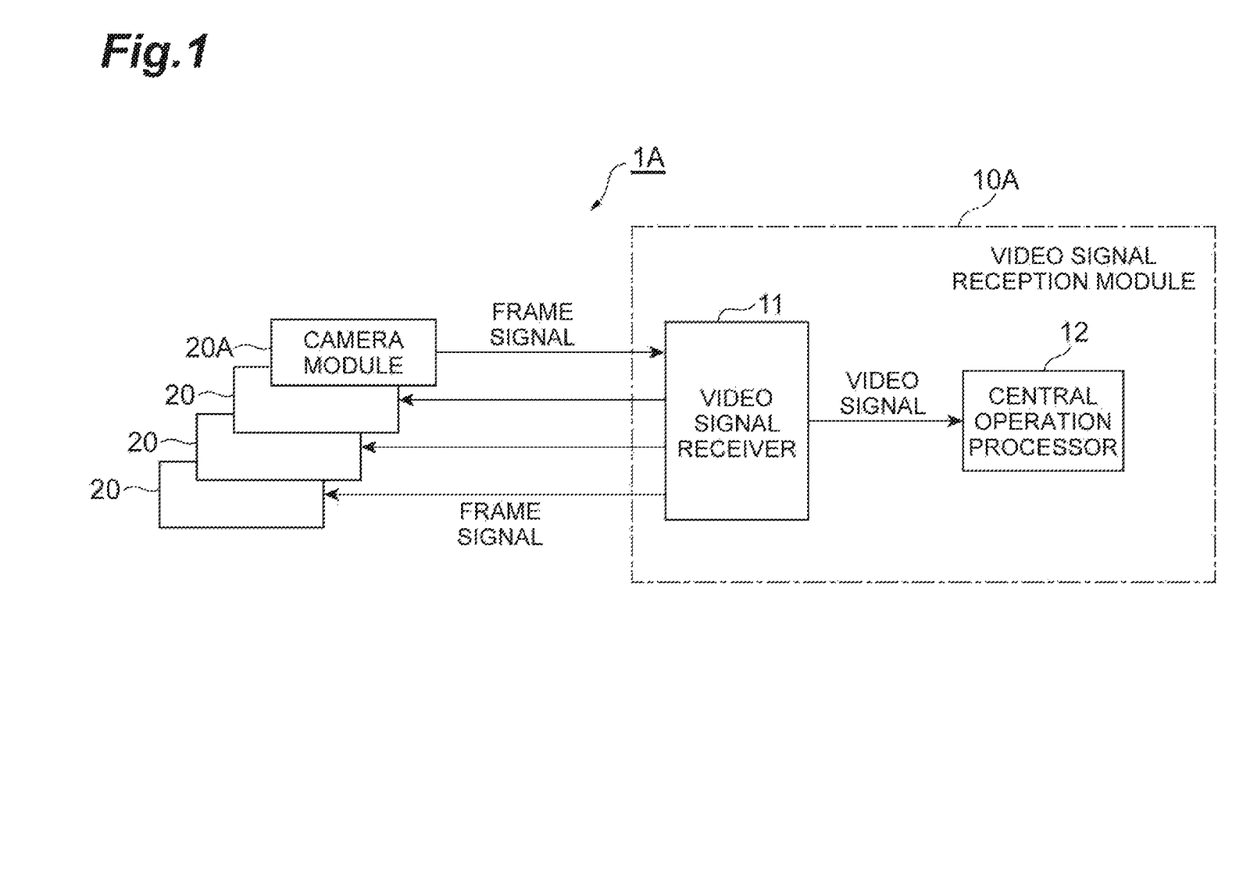
FIG. 1 is a diagram illustrating a configuration of a video signal transmission and reception system 1A of a first embodiment.
Figure 2:
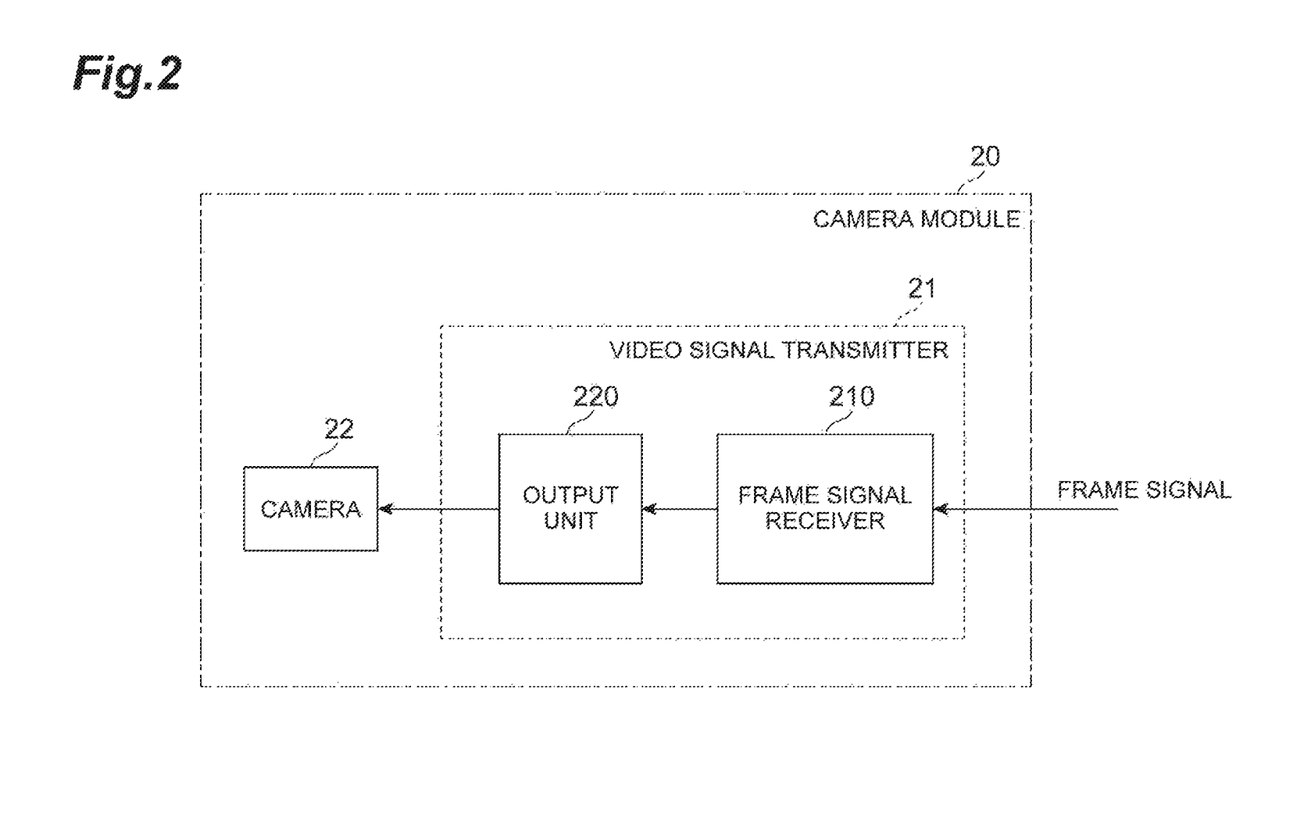
FIG. 2 is a diagram illustrating a configuration of a camera module 20.
Figure 3:
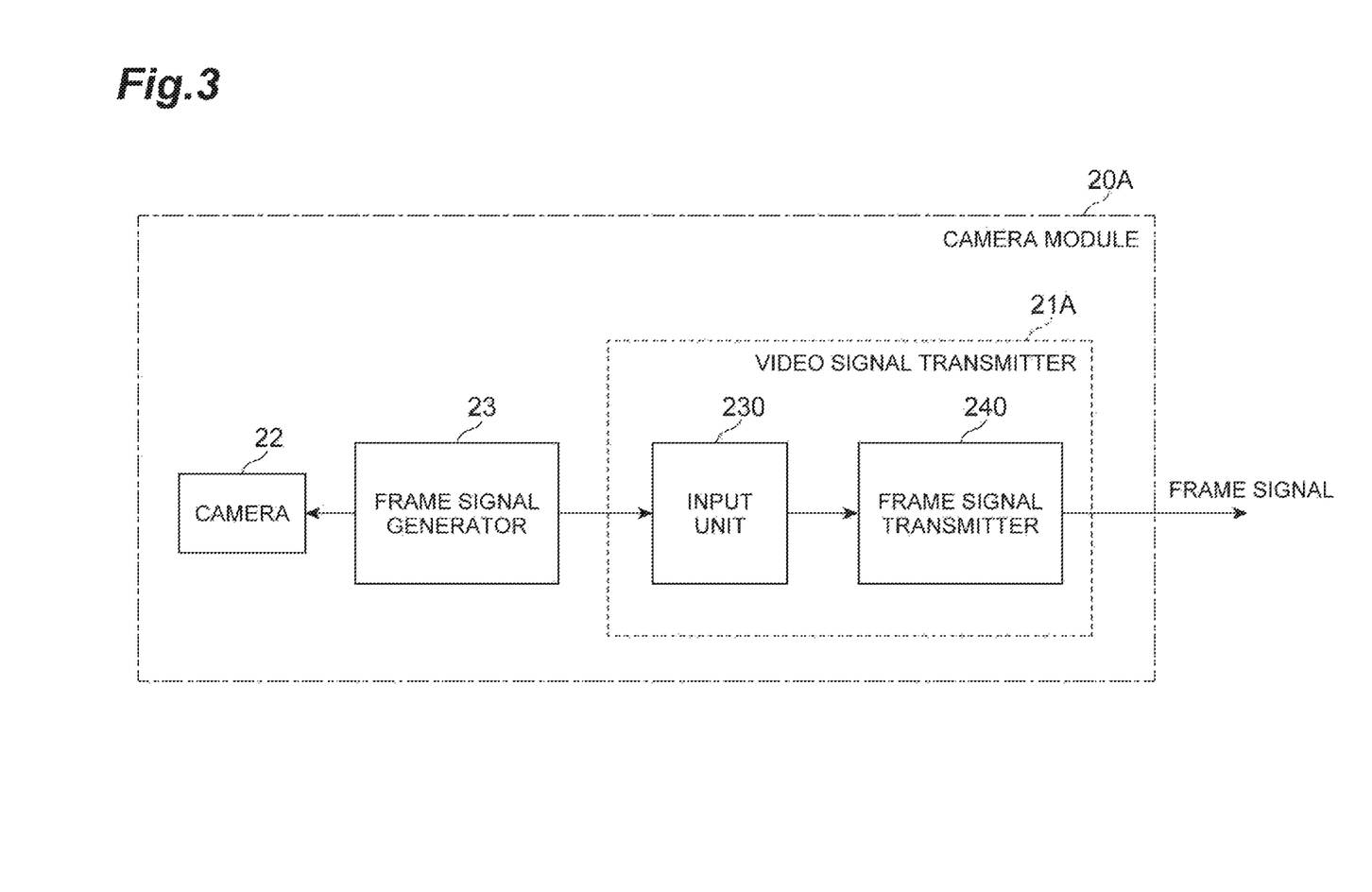
FIG. 3 is a diagram illustrating a configuration of a specific camera module 20A.

FIG. 1 is a diagram illustrating a configuration of a video signal transmission and reception system 1A of a first embodiment. The video signal transmission and reception system 1A includes a video signal receiver 11 in a video signal reception module 10A, a video signal transmitter 21 in a camera module 20, and a specific video signal transmitter 21A in a specific camera module 20A. The video signal reception module 10A includes the video signal receiver 11 and a central operation processor 12. The camera module 20 includes the video signal transmitter 21 and a camera 22 as illustrated in FIG. 2. The specific camera module 20A includes the specific video signal transmitter 21A, the camera 22, and a frame signal generator 23 as illustrated in FIG. 3.

While a configuration in which one specific camera module 20A and three camera modules 20 are connected to the video signal receiver 11 is illustrated in FIG. 1, the number of camera modules 20 connected to the video signal receiver 11 is not limited. In a case where the video signal transmission and reception system 1A is mounted in an automobile, the video signal reception module 10A and each camera module 20 (or 20A) are connected through a signal line having a long distance (for example, a length of greater than or equal to 10 m), and transmission and reception of a signal can be performed at such a long distance.

In each camera module 20 (FIG. the camera 22 includes a lens system and an image sensor (for example, a CMOS image sensor). In each camera module 20, the video signal transmitter 21 receives a frame signal sent from the video signal receiver 11 using a frame signal receiver 210 and outputs the frame signal to the camera 22 using an output unit 220. In a case where the frame signal is supplied from the video signal transmitter 21, the camera 22 performs capturing and outputs a video signal acquired by capturing to the video signal transmitter 21. The video signal transmitter 21 receives the video signal acquired by capturing by the camera 22 from the camera 22 and sends the video signal to the video signal receiver 11.

In the specific camera module 20A (FIG. 3), the frame signal generator 23 generates the frame signal. The frame signal generator 23 is implemented by, for example, a digital signal processor (DSP). In a case where the frame signal is supplied from the frame signal generator 23, the camera 22 performs capturing and outputs a video signal acquired by capturing to the specific video signal transmitter 21A. The specific video signal transmitter 21A receives the video signal acquired by capturing by the camera 22 from the camera 22 and sends the video signal to the video signal receiver 11. In addition, the specific video signal transmitter 21A receives input of the frame signal output from the frame signal generator 23 using an input unit 230 and sends the frame signal to the video signal receiver 11 using a frame signal transmitter 240. The "frame signal" in the present embodiment is a "frame signal that satisfies specifications required in the image sensor" and meets exact specifications such as a timing, voltage polarity, and a logic signal array.

While a configuration in which the frame signal generator 23 is disposed separately from the specific video signal transmitter 21A is illustrated in FIG. 3, the specific video signal transmitter 21A may be configured to include the frame signal generator 23. In this case, the camera module can have an inexpensive configuration.

The video signal receiver 11 receives the frame signal sent from the specific camera module 20A and sends the frame signal to the camera module 20. In addition, the video signal receiver 11 receives the video signal sent from the camera module 20 and the specific camera module 20A and outputs the received video signal to the central operation processor 12. The central operation processor 12 performs a necessary process based on the video signal received from the video signal receiver 11.

Figure 4:
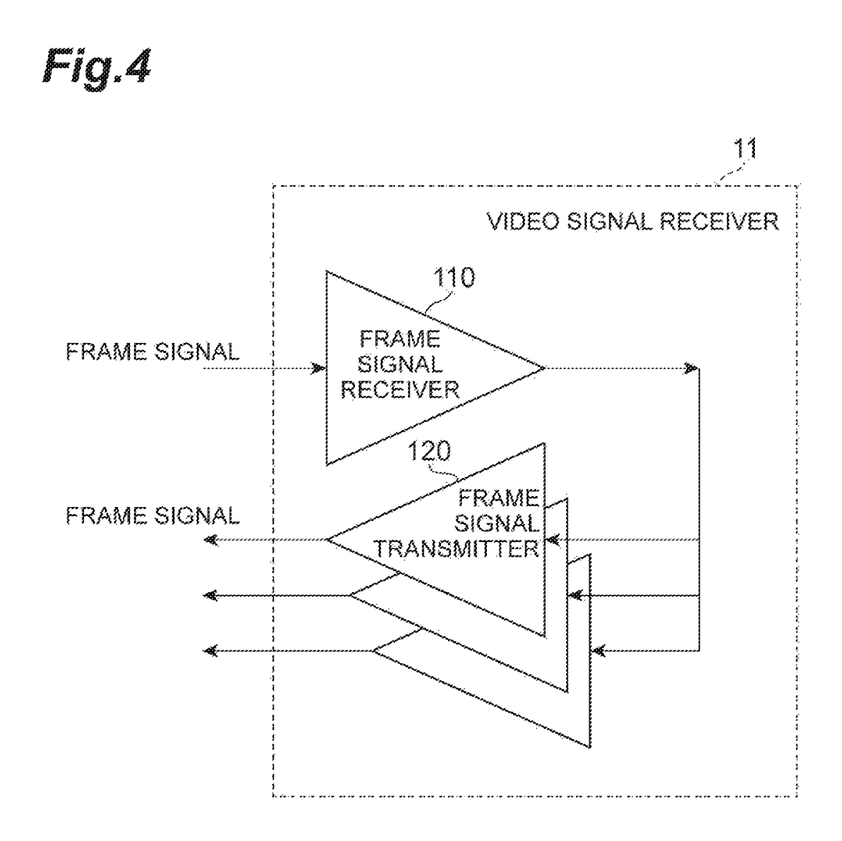
FIG. 4 is a diagram illustrating a configuration of a video signal receiver 11.

FIG. 4 is a diagram illustrating a configuration of the video signal receiver 11. The video signal receiver 11 includes a frame signal receiver 110 and a frame signal transmitter 120. The frame signal receiver 110 receives the frame signal sent from the specific video signal transmitter 21A in the specific camera module 20A. The frame signal transmitter 120 sends the frame signal received by the frame signal receiver 110 to three camera modules 20. The frame signal output from the frame signal receiver 110 may be input into the frame signal transmitter 120 through only the video signal receiver 11 or may temporarily leave the video signal receiver 11 and then, be input into the frame signal transmitter 120.

In the present embodiment, in the specific camera module 20A, the frame signal generated by the frame signal generator 23 is sent to the video signal receiver 11 from the specific video signal transmitter 21A. The frame signal is sent to the video signal transmitters 21 in three camera modules 20 from the video signal receiver 11.

In the present embodiment, the frame signal satisfying the specifications required in the image sensor can be easily supplied. That is, a supplier of the image sensor may supply the frame signal generator 23 that generates the frame signal satisfying the specifications required in the image sensor.

An expected format that is assumed by the supplier of the image sensor is present as an external trigger input of the image sensor. In order to implement the format, first, the supplier of the image sensor provides a dedicated companion image signal processor. This method is the most certain method. In addition, implementation by installing firmware inside the central operation processor is introduced as another method. For a product such as the video signal receiver that cannot be controlled by writing firmware after manufacturing, the most part of its operation is determined in advance by hardware, and only a part of formats that can be adjusted can be handled by external control. Thus, it cannot be said that the external trigger inputs of all image sensors can be handled in the video signal receiver. Therefore, the external trigger inputs of all image sensors can be handled in a case where an output of frame signal generation of the dedicated companion image signal processor (frame signal generator 23) provided by the supplier of the image sensor can be distributed to a plurality of cameras.

Even in the vehicle mounting industry, a supplier of the camera module is different from a supplier of a central operation processor module. The supplier of the central operation processor module or a final vehicle manufacturing maker mainly arbitrates roles, rules, and the like to be imposed. Rules that cover all of such business people accompany difficulty in implementation. Thus, it is desirable to reduce complicated rules. The output of external trigger generation is originally a signal needed inside the camera module. Thus, it is complicated to request the supplier of the central operation processor module to mainly perform design. In a case where the output of frame signal generation is created inside the camera module, and the output is distributed through exchange in an interface, a work that is needed by a business person of the central operation processor module is only interface IC setting, and delivery is easy.

In addition, in the present embodiment, the central operation processor 12 does not generate the frame signal, and the frame signal generator 23 in the specific camera module 20A generates the frame signal. In a case where the central operation processor 12 generates the frame signal, it is not easy to perform a process of generating the frame signal at a temporally high accuracy timing and sending the frame signal from a general-purpose terminal in the central operation processor that has to perform various processes. In addition, even in a case where the process of generating and sending the frame signal can be performed, the frame signal sending process may adversely affect other important processes due to limitations on a processing capability. Meanwhile, in the present embodiment in which the frame signal generator 23 in the specific camera module 20A generates the frame signal, the problem of the load of the central operation processor 12 is reduced.

Second Embodiment

Figure 5:
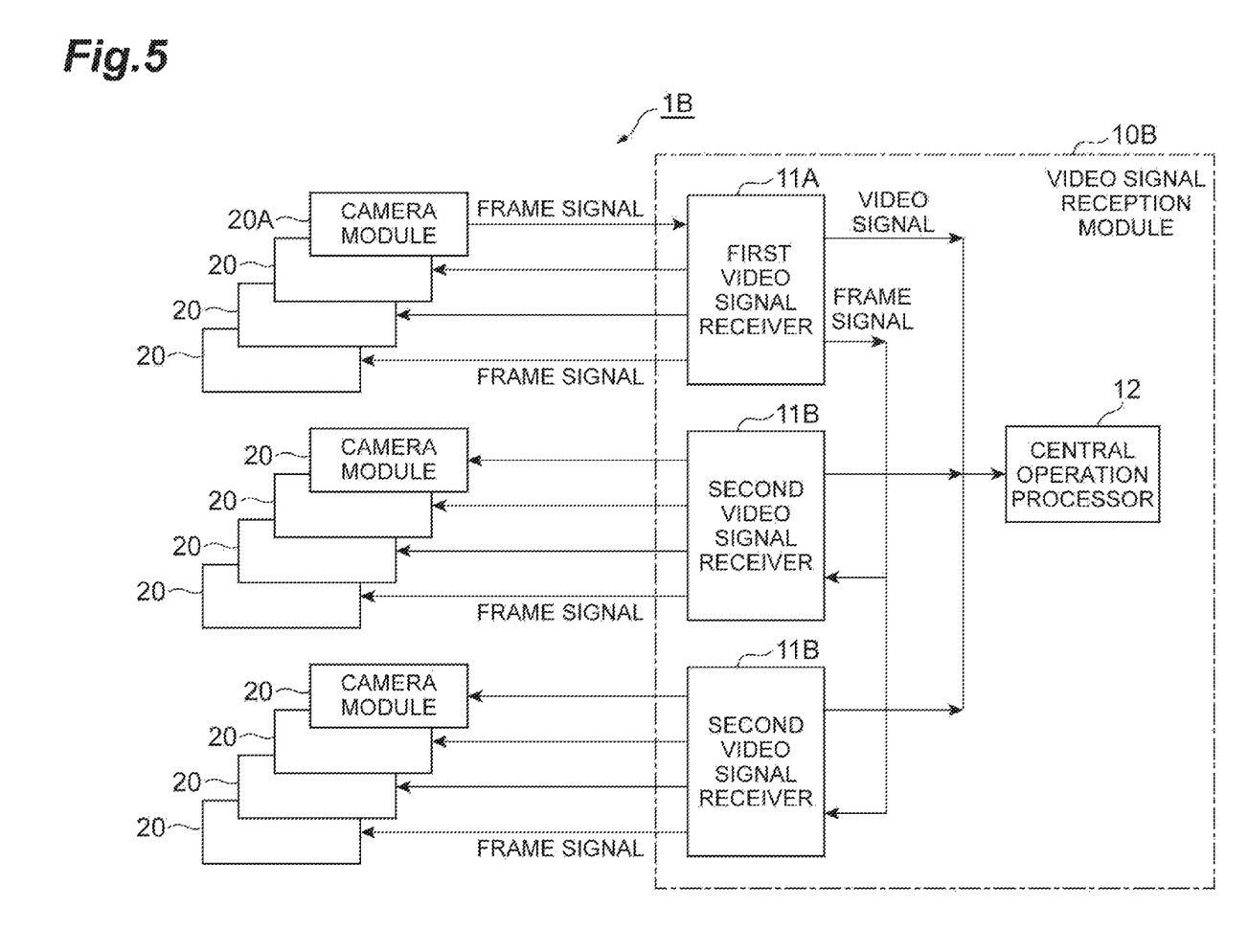
FIG. 5 is a diagram illustrating a configuration of a video signal transmission and reception system 1B of a second embodiment.

FIG. 5 is a diagram illustrating a configuration of a video signal transmission and reception system 1B of a second embodiment. The video signal transmission and reception system 1B includes a first video signal receiver 11A and a second video signal receiver 11B in a video signal reception module 10B, the video signal transmitter 21 in the camera module 20, and the specific video signal transmitter 211 in the specific camera module 20A. The video signal reception module 10B includes the first video signal receiver 11A, the second video signal receiver 11B, and the central operation processor 12. The camera module 20 has the configuration illustrated in FIG. 2. The specific camera module 20A has the configuration illustrated in FIG. 3.

While the video signal reception module 10B is configured to include one first video signal receiver 11A and two second video signal receivers 11B in FIG. 5, the number of second video signal receivers 11B included in the video signal reception module 10B is not limited. In addition, the number of camera modules connected to the first video signal receiver 11A and each second video signal receiver 11B is four in FIG. 5 but is not limited.

Figure 6:
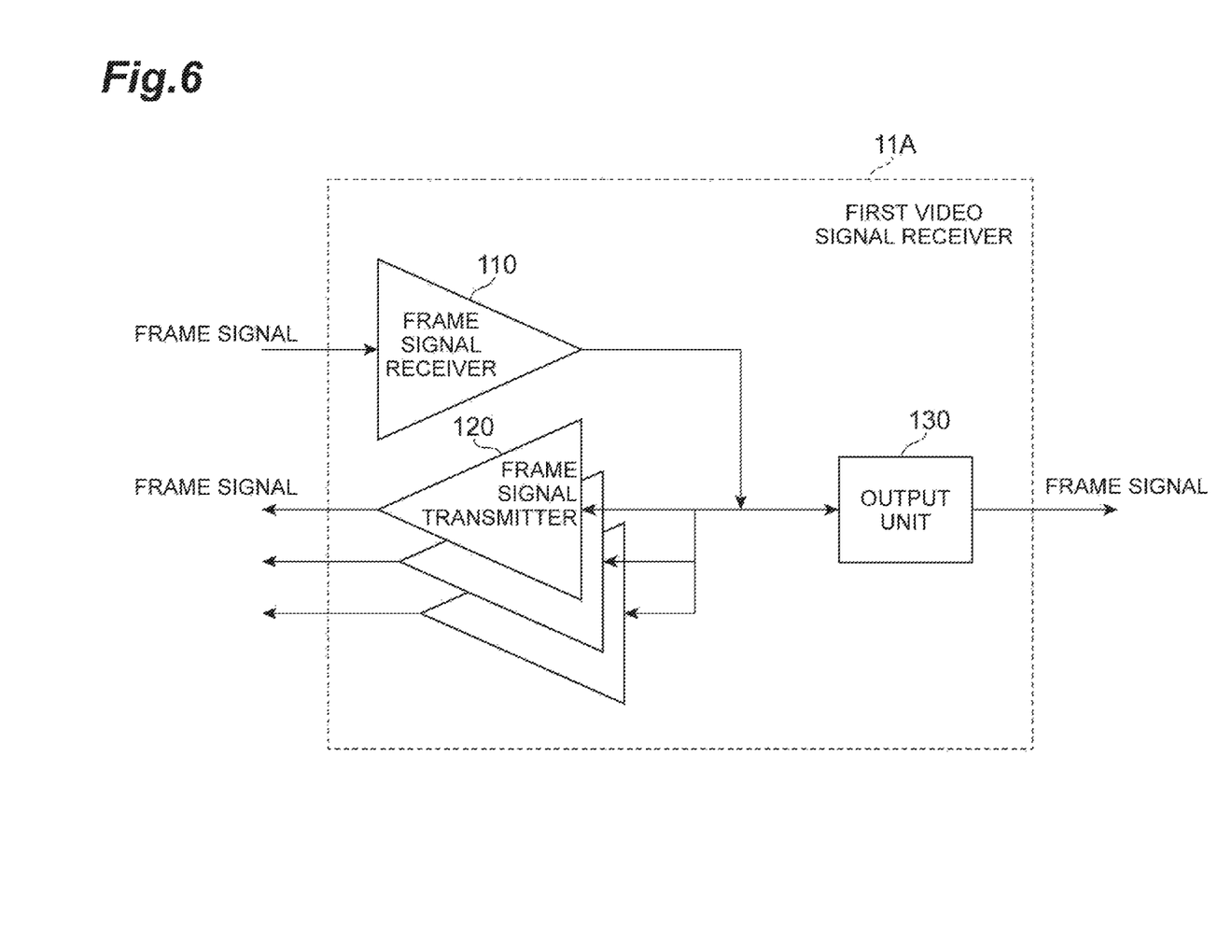
FIG. 6 is a diagram illustrating a configuration of a first video signal receiver 11A.

FIG. 6 is a diagram illustrating a configuration of the first video signal receiver 11A. The first video signal receiver 11A includes the frame signal receiver 110, the frame signal transmitter 120, and an output unit 130. The first video signal receiver 11A illustrated in FIG. 6 is different from the configuration illustrated in FIG. 4 in that the first video signal receiver 11A further includes the output unit 130. The frame signal transmitter 120 sends the frame signal received by the frame signal receiver 110 to the video signal transmitter 21 of a first group (that is, three video signal transmitters 21 connected to the first video signal receiver 11A through signal lines) other than the specific video signal transmitter 21A among a plurality of video signal transmitters. The output unit 130 outputs the frame signal received by the frame signal receiver 110 to the second video signal receiver 11B.

The frame signal output from the frame signal receiver 110 may be input into the frame signal transmitter 120 through only the first video signal receiver 11A or may temporarily leave the first video signal receiver 11A and then, be input into the frame signal transmitter 120. In the latter case, an input unit for inputting the frame signal output to the outside from the output unit 130 may be disposed, and the frame signal input by the input unit may be sent by the frame signal transmitter 120.

Figure 7:
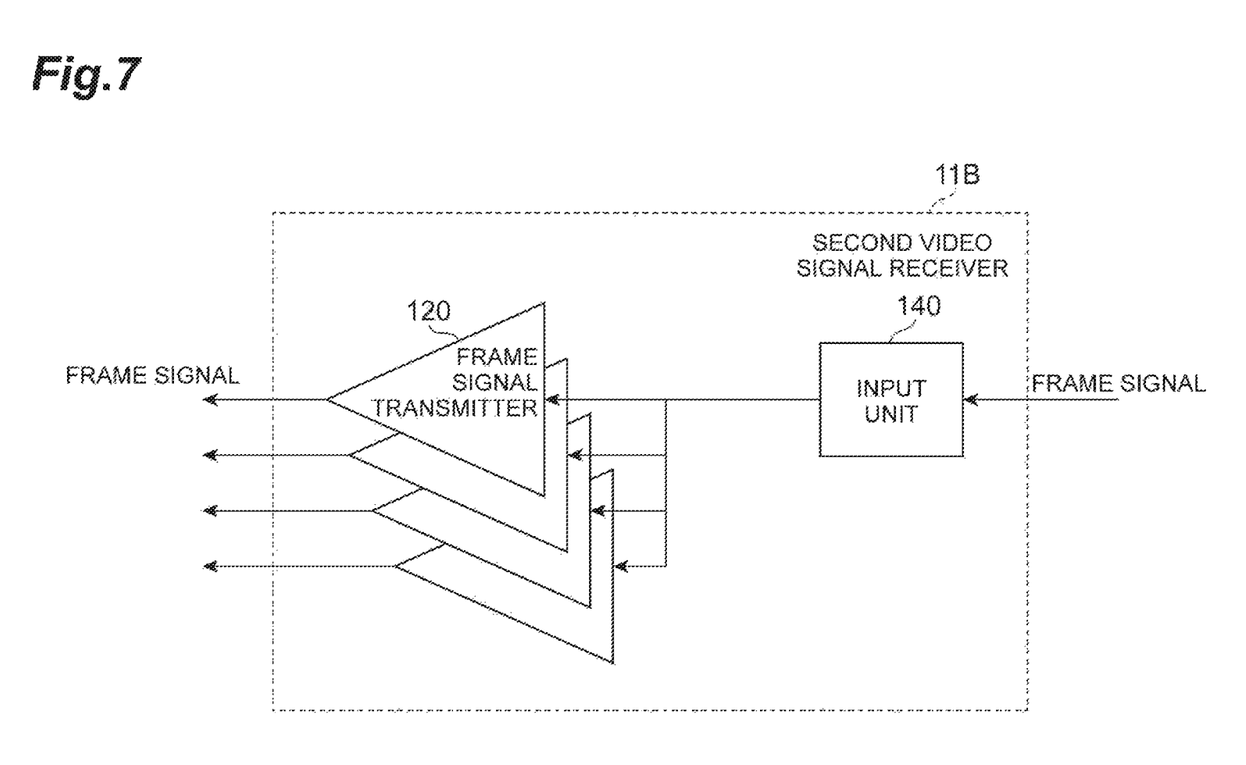
FIG. 7 is a diagram illustrating a configuration of a second video signal receiver 11B.

FIG. 7 is a diagram illustrating a configuration of the second video signal receiver 11B. The second video signal receiver 11B includes the frame signal transmitter 120 and an input unit 140. The input unit 140 inputs the frame signal output from the output unit 130 of the first video signal receiver 11A. The frame signal transmitter 120 sends the frame signal input by the input unit 140 to the video signal transmitter 21 of a second group (that is, four video signal transmitters 21 connected to the second video signal receiver 11B through signal lines) other than the specific video signal transmitter 21A among the plurality of video signal transmitters.

In the present embodiment, in the specific camera module 20A, the frame signal generated by the frame signal generator 23 is sent to the first video signal receiver 11A from the specific video signal transmitter 21A. The frame signal is sent to the video signal transmitters 21 in three camera modules 20 from the first video signal receiver 11A and is also sent to the second video signal receiver 11B from the first video signal receiver 11A. The frame signal sent to the second video signal receiver 119 is sent to the video signal transmitters 21 in four camera modules 20 from the second video signal receiver 11B.

In the present embodiment, the following effect is achieved in addition to the same effect as the first embodiment. That is, in the present embodiment, it is possible that the number of second video signal receivers 11B included in the video signal reception module 10B is not limited. The number of second video signal receivers 11B included in the video signal reception module 10B may be adjusted depending on the number of video signal transmitters 21 to which the video signal reception module 10B has to supply the frame signal at substantially the same timing. The video signal reception module 10B of the present embodiment can flexibly handle a change in the number of video signal transmitters 21 to be connected.

Third Embodiment

Figure 8:
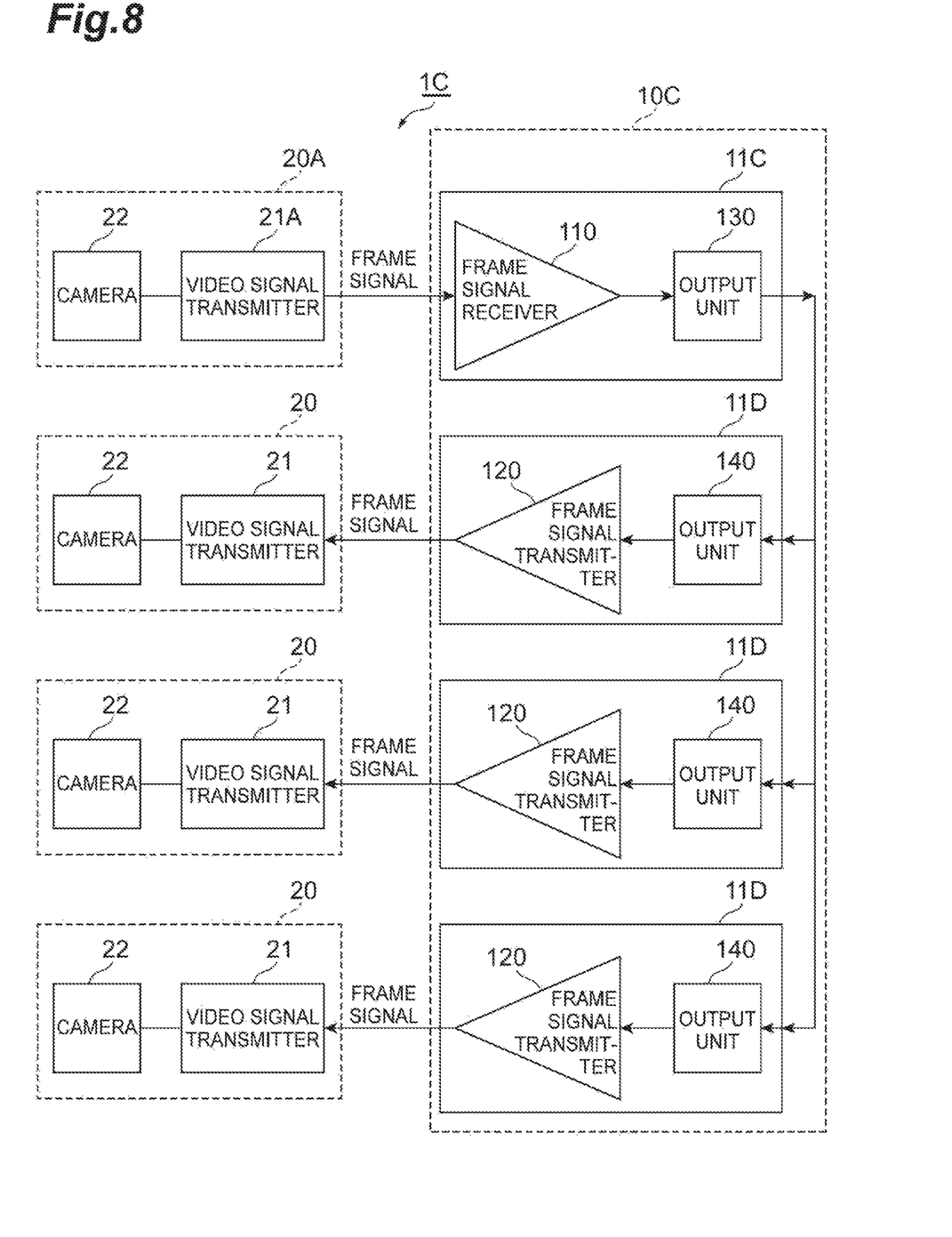
FIG. 8 is a diagram illustrating a configuration of a video signal transmission and reception system 1C of a third embodiment.

FIG. 8 is a diagram illustrating a configuration of a video signal transmission and reception system 1C of a third embodiment. The video signal transmission and reception system 1C includes a first video signal receiver 11C and a second video signal receiver 11D in a video signal reception module 10C, the video signal transmitter 21 in the camera module 20, and the specific video signal transmitter 21A in the specific camera module 20A.

The first video signal receiver 11C is connected to the specific video signal transmitter 21A through a signal line and receives the video signal sent from the specific video signal transmitter 21A. In addition, the first video signal receiver 11C receives the frame signal sent from the specific video signal transmitter 21A using the frame signal receiver 110 and outputs the received frame signal to each second video signal receiver 1117 using the output unit 130.

Each second video signal receiver 11D is connected to one video signal transmitter 21 through a signal line and receives the video signal sent from the video signal transmitter 21. In addition, each second video signal receiver 11D receives input of the frame signal output from the output unit 130 of the first video signal receiver 11C using the input unit 140 and sends the input frame signal to the corresponding video signal transmitter 21 using the frame signal transmitter 120.

In a case where a malfunction occurs at any location, such a configuration can prevent an increase in the range of the effect of the malfunction in addition to achieving the same effect as the second embodiment.

As described above, a video signal receiver includes a frame signal receiver that is connected to an output terminal of a specific video signal transmitter, and a frame signal transmitter that is connected to an output terminal of the frame signal receiver and is connected to an input terminal of a video signal transmitter of a first group other than the specific video signal transmitter. The central operation processor 12 (central processing unit (CPU)) includes a memory and can include a program that controls the above process. The memory can be disposed outside the central operation processor 12.

What is claimed is:

1. A video signal reception module comprising:
a first video signal receiver comprising:
a frame signal receiver that receives a first frame signal sent from a dedicated companion image signal processor (DSP) via a specific video signal transmitter, the first frame signal being used for a video signal of a first camera connected to the specific video signal transmitter, wherein the first frame signal indicates a first timing for a first image sensor of the first camera, and wherein the first camera outputs the video signal in response to an input of the first frame signal to the first camera, wherein the first frame signal output from the dedicated companion image signal processor is transmitted to the frame signal receiver through a signal line;
a frame signal transmitter that sends the first frame signal received from the frame signal receiver to a second camera other than the first camera as a second frame signal, the second frame signal being used for a video signal of the second camera, and the second frame signal indicating a second timing for a second image sensor of the second camera, wherein a difference between the first timing and the second timing is configured to cause the first camera and the second camera to capture images at substantially the same time;
an output unit that outputs the second frame signal when the first frame signal is received by the frame signal receiver; and
a video signal output terminal connected to a central operation processor; and
a second video signal receiver including:
an input unit that inputs the second frame signal output from the output unit of the first video signal receiver; and
a frame signal transmitter that sends the second frame signal input by the input unit to a plurality of cameras other than the first camera.

2. A video signal transmission and reception system comprising:
the video signal reception module according to claim 1;
the dedicated companion image signal processor connected to the first camera; and
the specific video signal transmitter connected to the video signal reception module by the signal line.

3. A video signal transmission and reception system comprising:
the video signal reception module according to claim 1; and
a first video signal transmitter comprising a frame signal transmitter that sends the first frame signal to the first camera, the first frame signal being used for a video signal of the first camera connected to the frame signal transmitter; and
a second video signal transmitter that sends the first frame signal output from the frame signal transmitter for the first camera to a second camera as the second frame signal, the second frame signal being used for a video signal of the second camera.

4. The video signal reception module according to claim 1, wherein the output of the first frame signal by the dedicated companion image signal processor provided by a supplier of the first image sensor is distributed to a plurality of cameras by the video signal receiver behaving as a control interface.

5. The video signal reception module according to claim 1, wherein the difference between the first timing and the second timing is configured to cause the first camera and the second camera to capture images in a high speed vehicular environment at substantially the same time.

6. A video signal reception module according to claim 1, wherein the length of the signal line is 10 m or more.

7. A video signal reception module comprising:
a first video signal receiver including a frame signal receiver that receives a first frame signal sent from a dedicated companion image signal processor (DSP) via a specific video signal transmitter, the first frame signal being used for a video signal of a first camera connected to the specific video signal transmitter, wherein the first frame signal indicates a first timing for an image sensor of the first camera, and wherein the first camera outputs the video signal in response to an input of the first frame signal to the first camera, wherein the first frame signal output from the dedicated companion image signal processor is transmitted to the frame signal receiver through a signal line; and a second video signal receiver including a frame signal transmitter that sends the first frame signal received from the frame signal receiver of the first video signal receiver to a second camera other than the first camera as a second frame signal, the second frame signal being used for a video signal of the second camera, and the second frame signal indicating a second timing for a second image sensor of the second camera, wherein a difference between the first timing and the second timing is configured to cause the first camera and the second camera to capture images at substantially the same time.

8. The video signal reception module according to claim 7, wherein the difference between the first timing and the second timing is configured to cause the first camera and the second camera to capture images in a high speed vehicular environment at substantially the same time.

9. A video signal reception module according to claim 7, wherein the length of the signal line is 10 m or more.

10. A video signal receiver comprising:

a frame signal receiver that receives a first frame signal sent from a dedicated companion image signal processor (DSP) via a specific video signal transmitter, the first frame signal being used for a video signal of a first camera connected to the specific video signal transmitter, wherein the first frame signal indicates a first timing for a first image sensor of the first camera, and wherein the first camera outputs the video signal in response to an input of the first frame signal to the first camera; and a frame signal transmitter that sends the first frame signal received from the frame signal receiver to a second camera other than the first camera as a second frame signal, the second frame signal being used for a video signal of the second camera, and the second frame signal indicating a second timing for a second image sensor of the second camera, wherein a difference between the first timing and the second timing is configured to cause the first camera and the second camera to capture images at substantially the same time, wherein a difference between the second timing and the first timing is less than 150 microseconds.

* * * * *